United States Patent [19]
Hansen et al.

[11] 3,942,757
[45] Mar. 9, 1976

[54] VALVE ACTUATING MECHANISM

[75] Inventors: Kenneth B. Hansen, Enfield; Robert K. Olson, Bloomfield, both of Conn.

[73] Assignee: United Technologies Corporation, Hartford, Conn.

[22] Filed: Oct. 10, 1974

[21] Appl. No.: 513,584

[52] U.S. Cl. .................... 251/78; 251/263; 74/567
[51] Int. Cl.² ......................................... F16K 31/524
[58] Field of Search ............. 251/251, 263, 262, 77, 251/78; 74/567

[56] References Cited
UNITED STATES PATENTS

| | | | |
|---|---|---|---|
| 2,872,149 | 2/1959 | Battey | 251/263 X |
| 3,142,186 | 7/1964 | Melton | 251/77 X |
| 3,259,359 | 7/1966 | Wahlin | 251/263 |
| 3,818,771 | 6/1974 | Kobelt | 74/567 X |

Primary Examiner—Alan Cohan
Attorney, Agent, or Firm—John D. Del Ponti

[57] ABSTRACT

A spring biased poppet valve has the exposed end of its poppet plunger engaging the underside of a lever, and the poppet and lever are biased upwardly so that a tit on the upperside of the lever engages a cam surface defined on a cam member loosely mounted on a generally horizontal rock shaft. The shaft can be moved through an angular range of displacements as part of a normal control system, which system receives fluid operating pressure through the open poppet valve. An adjustable stop screw mounted to the shaft is so oriented that the cam member is positively moved about the axis of the shaft when the shaft has reached a predetermined angular displacement, whereby further movement of the shaft permits the spring loaded poppet valve to close.

5 Claims, 1 Drawing Figure

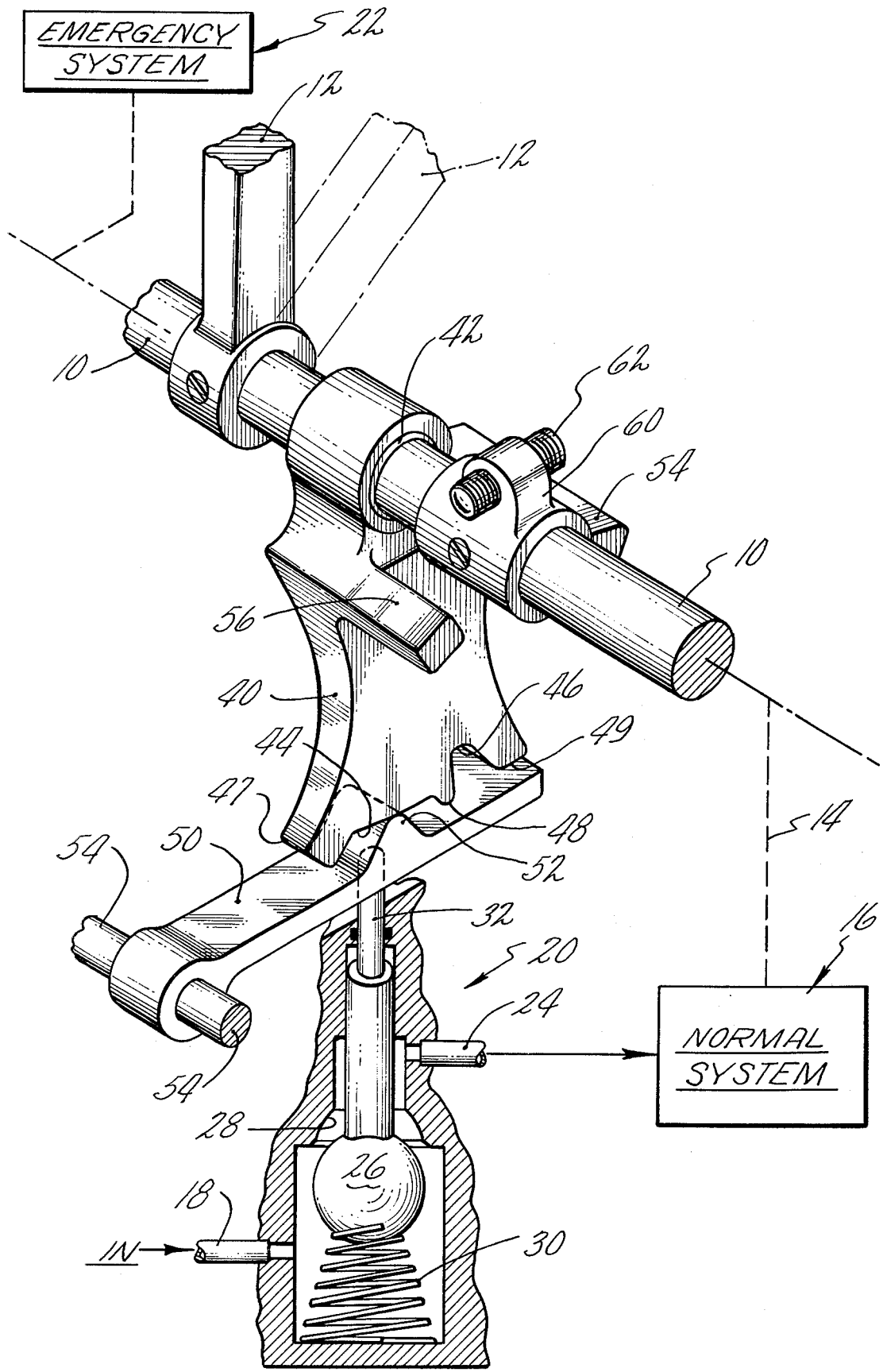

VALVE ACTUATING MECHANISM

SUMMARY OF INVENTION

This invention relates generally to valve actuating mechanisms, and deals more particularly with a mechanism suitable for use in a control system for selectively operating a poppet valve in response to movement of a control member to and beyond a predetermined position. The valve actuating mechanism provides a "dead band" for a cam member such that only when the control member is moved to or beyond a predetermined position will the cam member actuate the poppet valve.

The control member comprises a lever on an angularly movable rock shaft, and the precise angle at which a poppet valve is actuated can be conveniently adjusted through a stop screw provided on the shaft. The screw is adapted to engage at least one abutment provided on a cam member loosely received on the shaft, which cam member has a cam surface with segments of differing radii. These cam segments are engaged by an idler lever, which lever is in turn engaged by the poppet so that rotation of the cam member serves to allow the spring loaded poppet to move, actuating the valve, but only when the stop screw has engaged the abutment on the cam member, the shaft being free to rotate independently of the cam member at least through a range of angular displacements. The idler lever provided between the poppet and the cam surface minimizes side loads on the valve poppet and also minimizes stresses on the cam segments. The cam follower portion of the lever preferably comprises a raised protuberance which cooperates with lobes on the cam to restrict the cam member's movement in one or the other of its two positions.

The general aim of the present invention is to provide a valve actuating mechanism such that actuation of a valve is precluded through a "normal" range of angular displacements of a shaft, but rotation thereof beyond a predetermined angular position does actuate the valve.

BRIEF DESCRIPTION OF THE DRAWING

The single FIGURE shows a valve actuating mechanism constructed in accordance with the present invention, and also shows in schematic fashion the relationship of such mechanism and valve to a normal and an emergency control system of the type which are adapted to be alternatively selected for use as a result of rotation of movement of a control member.

DETAILED DESCRIPTION

Turning now to the drawing in greater detail, a control member in the form of a rock shaft 10 is mounted for limited angular rotation, as for example in response to movement of a control lever 12, in order to supply a signal, through a conventional linkage as indicated schematically at 14, to a normal control system 16. The system 16 is operated through fluid pressure, and such system amy comprise a flapper valve or motor in conjunction with an orifice so that the supply of fluid pressure from line 24 can be utilized to selectively actuate a torque motor or the like, thereby providing an amplified signal responsive to movement of the shaft 10 and lever 12. The normal system 16 communicates with a supply of fluid pressure, represented by line 18, through a poppet valve 20. As shown, the valve is in its open position, and the mechanism to be described assures that this valve remains open at least when the control member or rock shaft 10 is moved through a predetermined angular range of displacements. For example, 120° might be conveniently utilized in a throttle linkage or the like. However, the invention described is not to be construed as limited to a fuel control system, and any desired range might be made available for conventional use of a control system such as that depicted schematically by reference to the solid and broken line positions depicted for the lever 12.

The valve actuating mechanism of the present invention comprises a convenient device for interrupting operation of the normal system 16, as for example to permit control of an engine or other apparatus (not shown) by an emergency system, as indicated generally at 22 in the drawing. Such an emergency system might, for example, be electrically energized, and actuated in response to a limit switch so arranged as to be closed when the rock shaft 10 reaches a predetermined angular position outside of the range referred to in the preceeding paragraph. The valve actuating mechanism to be described provides a convenient means for interrupting the supply of fluid pressure to the normal system 16 through the poppet valve 20 when this shaft 10 has reached such a predetermined position.

The poppet valve 20 comprises a conventional component of the present system and includes an inlet port associated with line 18 and an outlet port associated with line 24. Thus the valve 20 controls the supply of fluid under pressure to the normal system 16. The valve element preferably comprises a ball 26 which is biased against an annular valve seat 28 by a coiled compression spring 30, which ball is adapted to be held in the open position shown as a result of a downward force exerted on the poppet member 32. The poppet or plunger 32 includes a lower end portion 32 adapted to engage the upper surface of the ball 26 for holding the ball in the unseated condition shown, thereby opening the valve. However, when the plunger or poppet 32, in conjunction with the ball element 26, is allowed to move upwardly the ball 26 seats against the surface 28 under the biasing force of the spring 30 closing the valve, and interrupting the fluid pressure supply to the normal system 16.

Turning next to the means for operating the valve 20, and more particularly to the means for allowing the plunger 32 and the ball 26 to move upwardly in response to the biasing force provided by the spring 30, said means preferably comprise a cam member 40 having an upper portion 42 loosely received on the horizontal rock shaft 10, an idler lever 50 having a cam follower tit or protuberance 52 for engaging the cam surface on the member 40, and a stop screw assembly 60 affixed to the shaft 10. The lever 50 serves as a convenient means for imparting vertical movement to the plunger 32 from the cam surface defined at the free end portion of the cam member 40, without exerting side forces on the plunger 32. As shown the lever 50 is pivotally mounted for limited oscillatory motion in a vertical plane on the horizontal pivot pin 54, the axis of which pin 54 is generally parallel to the axis of the rock shaft 10. The protuberance 52 is defined in the upper surface of the lever 50 generally opposite the underside of such lever which is engaged by the plunger 32.

As so oriented the protuberance 52 is adapted to engage either one of two cam segments 44 and 46 defined at the free end of the cam member 40. These cam segments 44 and 46 are preferably separated by a medial lobe 48, and the end portions of each of these segments 44 and 46 are more particularly defined by end lobes 47 and 49. These end lobes 47 and 49 provide stop surfaces for engaging the sides of the protuberance 52 on the lever to positively limit arcuate motion of the cam member 40 about the axis of the shaft 10. The cam member 40, and more particularly its upper end portion 42, is loosely received on the shaft 10 as mentioned previously, but means is provided on the shaft in the form of the stop assembly 60 for imparting arcuate motion to the cam member 40 when the angular position of the shaft reaches a predetermined angular displacement. Thus, as a result of adjusting the position of the stop screw 62 the angle at which the cam member 40 follows rotation of the shaft 10 can be conveniently preset.

With protuberance 52 engaging cam segment 44 as shown in the drawing the valve 20 will be opened allowing pressure to reach the normal system 16. However, as the shaft 10 is rotated clockwise beyond the position shown in broken lines for the lever 12, stop screw 62 engages a generally radially extending abutment surface 54 defined on the cam member 40 with the result that the cam member is positively rotated from the position shown, and beyond said position, to cause the depending medial lobe 48 to engage tit 52 and to rotate idler lever 50 downwardly depressing poppet plunger 32 but valve 20 remains open. The purpose of the medial lobe 48 is to offer some resistance to clockwise rotation of the shaft 10, thereby giving the operator a positive indication or "feel" that tells him he is switching over from Normal to Emergency System Operation.

As the medial lobe 48 on cam member 40 passes over the protuberance 52 on the lever, the lever will be raised upwardly under the spring force provided by the coil spring 30 in the poppet valve 20. This action will cause the valve element 26 to seat and thereby close the valve. Further angular travel of the shaft 10 will result in no further action to the valve member, but may provide an input signal, electrical or otherwise, to the emergency system 22.

Means is provided for reopening the valve 20, in response to return movement of the lever 12. Return movement of the lever 12 beyond a predetermined angular position of the shaft 10, in said return, or opposite direction causes the opposite end of stop screw 62 to engage a second generally radially extending abutment surface 56 defined for this purpose on the cam member 40. The medial lobe 48 will offer some resistance to rotation of the shaft 10 in this direction also, thereby giving the operator a positive indication that he is changing from Emergency to Normal System Operation. The protuberance 52 on lever 50 will again engage the cam segment 44 as shown in the drawing with the result that the valve 20 will remain open, and fluid pressure again is available to the normal system 16.

Thus, an angular dead band is provided for the rock shaft 10 and its associated lever 12 such that the shaft is permitted an angular range of displacements which, when exceeded, will result in actuation of the valve 20. In the example shown the valve 20 is closed, but it will be apparent to those skilled in the art that a valve could be arranged so as to be opened by the mechanism of the present invention. The mechanism disclosed also provides for return movement of the shaft 10 to return the valve 20 to its "normal" position.

We claim:

1. The combination comprising a valve including an element movable between open and closed positions, biasing means for urging said element toward one of said positions, a poppet having an inner end movable with said valve element and an outer end, means for moving such poppet against the force of said biasing means, a rock shaft which is rotatable on its axis through a normal range of angular displacements and through a predetermined angular displacement to a second range of angular displacements, said means for moving said poppet including a cam member rotatably mounted on said shaft and having a free end portion which defines a cam surface, at least two segments of said cam surface having different radii with respect to said shaft axis, a crank arm carried by said shaft and including screw means for engaging a first abutment surface on said cam member to rotate it together with said shaft beyond said predetermined angular displacement, said cam surface being so located with respect to said poppet that said cam surface segments permit said valve element to be selectively held in an open and in a closed position respectively, and wherein said cam member further includes a second abutment surface angularly related to said first abutment surface with respect to said shaft axis, said second abutment surface being engageable with an opposite end of said screw means.

2. The combination defined by claim 1 wherein said means for moving said poppet further includes a lever mounted for limited pivotal movement on an axis generally parallel to that of said shaft, said lever having a lower surface engaging said poppet and an upper surface which defines a cam following protuberance for engaging said cam surface.

3. The combination defined by claim 2 wherein said cam surface includes a depending medial lobe between said two segments, said medial lobe and said lever defined protuberance causing some resistance to rotation of said shaft beyond said predetermined angular displacement.

4. The combination defined by claim 3 wherein said cam surface further includes depending end lobes for limiting angular rotational movement of said cam member upon engagement of said end lobes with said lever defined protuberance.

5. The combination defined by claim 1 wherein said means for moving said poppet further includes a lever mounted for limited pivotal movement on an axis generally parallel to that of said shaft, said lever having a lower surface engaging said poppet and an upper surface which defines a cam following protuberance for engaging said cam surface.

* * * * *